(12) United States Patent
Bedwell

(10) Patent No.: US 6,351,985 B1
(45) Date of Patent: Mar. 5, 2002

(54) METHOD AND APPARATUS FOR DETECTING THE LOCATION OF A LEAK IN A PIPE

(75) Inventor: Leslie William Bedwell, Suffolk (GB)

(73) Assignee: Radiodetection Limited, Bristol (GB)

( * ) Notice: Subject to any disclaimer, the term of this patent is extended or adjusted under 35 U.S.C. 154(b) by 0 days.

(21) Appl. No.: 09/479,156

(22) Filed: Jan. 7, 2000

(30) Foreign Application Priority Data

Jan. 9, 1999 (GB) ................................. 9900471

(51) Int. Cl.[7] ............................................. G01M 3/04
(52) U.S. Cl. ........................ 73/49.8; 73/49.1; 73/40.5; 138/90
(58) Field of Search .................... 73/40.5 A, 40.5 R, 73/40.7, 49, 49.1, 49.5, 49.8; 138/90

(56) References Cited

U.S. PATENT DOCUMENTS

| | | | | |
|---|---|---|---|---|
| 2,164,195 A | * | 6/1939 | Waltermire | 138/90 |
| 3,431,946 A | * | 3/1969 | Sawyer | 73/40.5 R |
| 3,837,214 A | * | 9/1974 | Guest | 73/40.5 R |
| 4,513,903 A | * | 4/1985 | Feldstein et al. | 228/107 |
| 5,611,948 A | * | 3/1997 | Hawkins | 219/121.63 |
| 5,771,937 A | * | 6/1998 | Collins | 138/90 |
| 6,026,675 A | * | 2/2000 | Jansch | 73/49.5 |
| 6,131,441 A | * | 10/2000 | Berube et al. | 73/49.8 |

FOREIGN PATENT DOCUMENTS

| | | | | |
|---|---|---|---|---|
| GB | 762629 | * | 11/1956 | 73/40.5 |

* cited by examiner

Primary Examiner—Hezron Williams
Assistant Examiner—Michael Cygan
(74) Attorney, Agent, or Firm—Renner, Kenner, Greive, Bobak, Taylor & Weber

(57) ABSTRACT

Apparatus for detecting a leak in a pipe, and determining the location of that leak, comprises a cover plate for an opening into the pipe to be tested, such as an end cap for threading onto the end of a pipe, the cover plate having an aperture through which extends a flexible hose having an inflatable bladder at its free end. The hose is calibrated from its free end and is pushed into the pipe through the aperture for a known distance, whereafter the bladder is inflated by air supplied under pressure to the hose, so as to seal the pipe between the bladder and the cover plate. Air under pressure is then supplied to the sealed portion of the pipe and the pressure drop within that sealed portion is monitored over a period of time. By repeatedly performing the method but each time moving the hose further into the pipe, the location of the leak may accurately be determined. Instead of calibrating the hose, a sonde device may be mounted on the free end of the hose and an above ground receiver for signals transmitted from the sonde is used to determine the position of the sonde and so of the free end of the pipe.

19 Claims, 3 Drawing Sheets

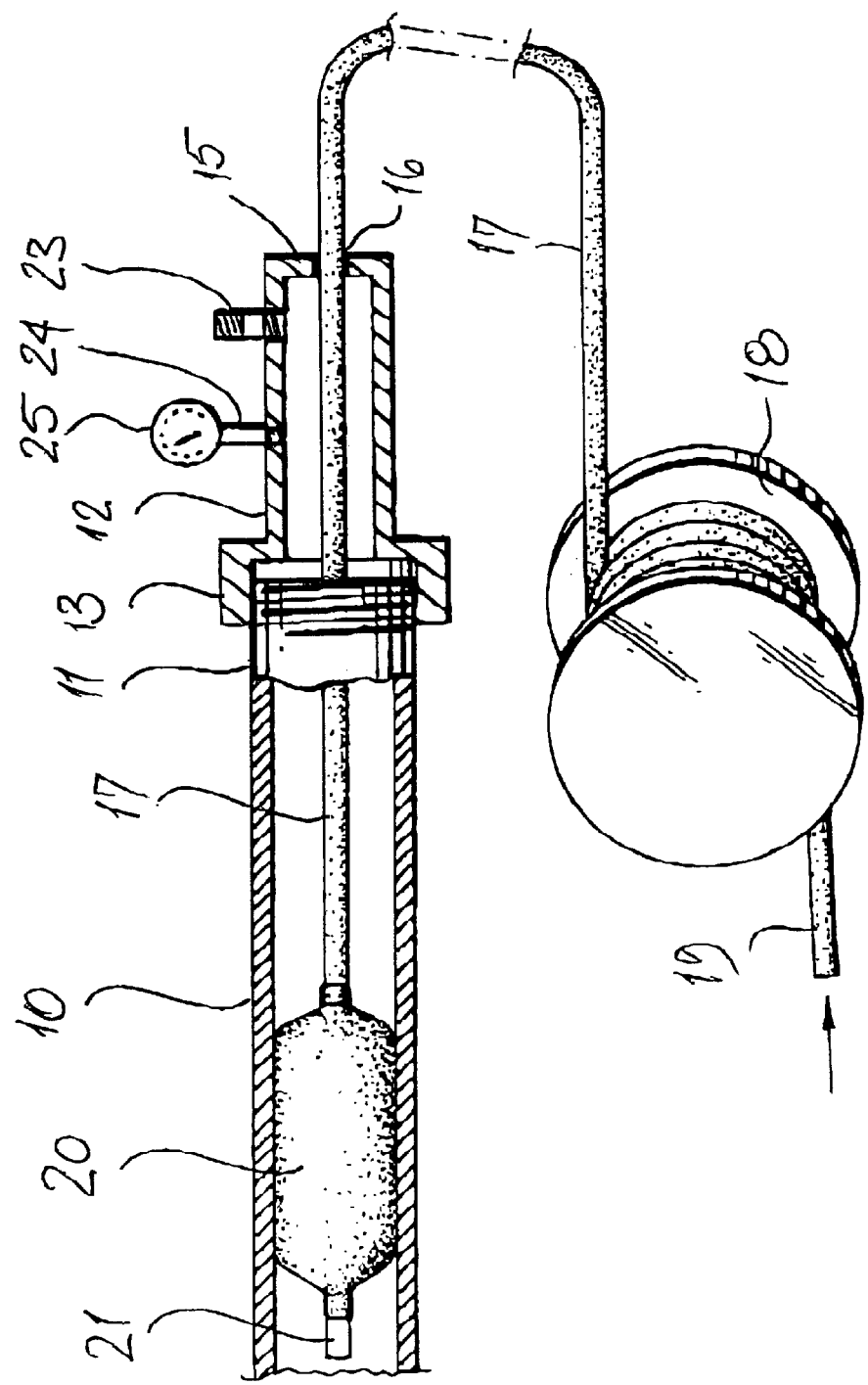

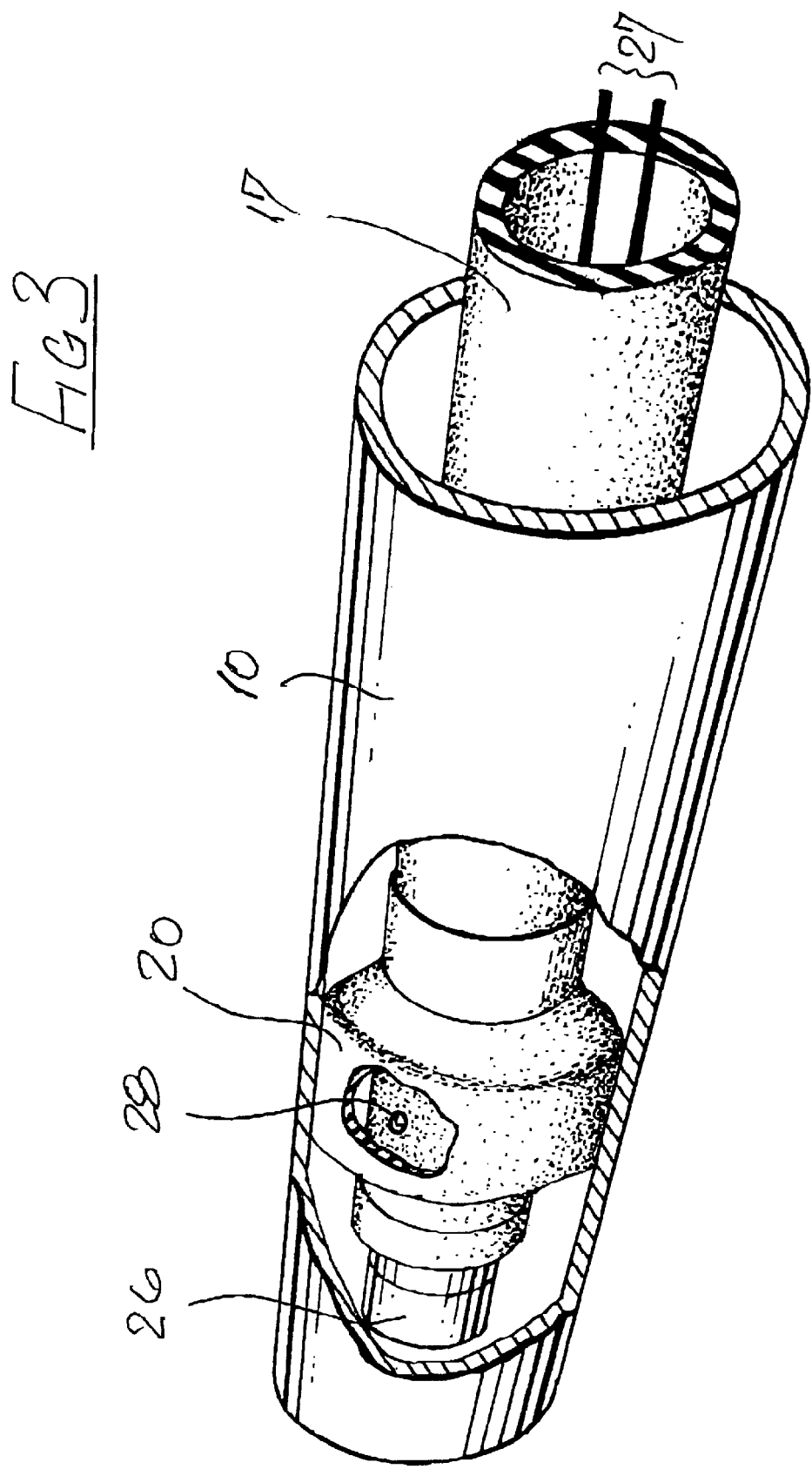

METHOD AND APPARATUS FOR DETECTING THE LOCATION OF A LEAK IN A PIPE

BACKGROUND TO THE INVENTION a) Field of the Invention

This invention relates to apparatus for detecting a leak in a pipe, as well as a method of determining the location of such a leak. The invention finds a particular application to the detection of the location of a leak in an underground pipe such as a water pipe, though it is to be understood that the invention is not limited to that particular use.

b) Description of the Prior Art

Fresh drinking-quality water as piped to residential and business premises is a valuable commodity and recently much emphasis has been placed on the elimination of leaks in the pipe network taking the water from a water-works to each premises requiring water. It is relatively easy to determine whether there is a leak in a given length of pipe, but it is very much more difficult to determine the precise location of that leak. For example, a pipe may be closed off at two points where access can be gained to the pipe, the water in the pipe then being pressurised. By disconnecting the source of pressure and then monitoring the pressure in the pipe over a pre-set period of time, it can be determined whether there is a leak of greater than an acceptable amount, allowing for minor leakage with the test equipment.

The difficulty is establishing where the leak is, especially if the two access points are spaced apart by a considerable distance. The usual solution is to dig test-holes at spaced intervals along the length of the pipe and to monitor the water content in the ground, around the pipe. In this way, it is possible eventually to locate the region of the leak, permitting a relatively large excavation to be performed in order to effect a repair. If however the ground through which the pipe extends is relatively wet, it may not be possible to establish the location of the leak other than by much more extensive excavations.

OBJECTS OF THE INVENTION

It is a principal object of the present invention to provide apparatus for detecting a leak in a pipe, which apparatus is both simple to use and effective in determining the presence of a leak. It is a further object of a preferred form of the apparatus to facilitate the location of a leak in a pipe, once the presence of a leak has been determined.

Yet another object is to provide a method for determining the location of a leak in an underground pipe, in a simple and effective manner.

SUMMARY OF THE INVENTION

According to one aspect of the present invention, there is provided apparatus for detecting a leak in a pipe, which apparatus comprises a closure member for sealing an opening in the pipe, the closure member having an aperture therethrough, and a flexible fluid supply hose having a free end and slidably extending in a sealable manner through said aperture in the closure member. An inflatable seal member is disposed at or adjacent the free end of the hose which seal member is inflatable by fluid (such as air) supplied under pressure to the hose, there being means to supply that fluid under pressure to the interior of the pipe after the hose has been passed into the pipe through the aperture in the closure member and the seal member has been inflated. Pressure-sensing apparatus is arranged to sense the fluid pressure within the pipe following the supply of fluid under pressure to the pipe whereby a subsequent drop in pressure may be determined.

It will be appreciated that use of the apparatus of this invention requires access to a pipe at only one point. A length of the pipe from the access point may be isolated and then subjected to a pressure test. By repeating the testing process but isolating different lengths of pipe from the access point, it should be possible to determine the location of the leak (if there be one) by finding two adjacent points at one of which pressure is substantially maintained but at the other of which pressure falls away, over time.

According to a second aspect of this invention, there is provided a method of determining the location of a leak in a pipe, which method comprises fitting a closure member in a sealing manner to an opening in the pipe, the closure member having an aperture therein through which extends a flexible fluid supply hose in a slidable and sealable manner and the hose having an inflatable seal member at or adjacent its free end for inflation by fluid supplied under pressure to the hose. The hose is slid through the aperture until a known length of hose has entered the pipe, whereafter the seal member is inflated to effect a seal to the interior wall of the pipe, and then fluid under pressure is supplied to the interior of the pipe. The pressure in the pipe is sensed and monitored for a fall in that pressure in excess of a pre-set amount, over a pre-set period.

According to a further and closely related aspect of this invention, there is provided a method of determining the location of a leak in a pipe, which method comprises fitting a closure member in a sealing manner to an opening in the pipe, the closure member having an aperture therein through which extends a flexible fluid supply hose in a slidable and sealable manner and the hose having an inflatable seal member at or adjacent its free end for inflation by fluid supplied under pressure to the hose and further having, at or adjacent its free end, a device selected from the group consisting of an active transponder, a passive transponder and an electromagnetic transmitter sonde. The hose is slid through the aperture while monitoring from the surface the position of the free end of the hose by means of an electromagnetic location determining device in communication with said device at or adjacent the free end of the hose. Thereafter the seal member is inflated to effect a seal to the interior wall of the pipe, and then fluid under pressure is supplied to the interior of the pipe. The pressure in the pipe is sensed and monitored for a fall in that pressure in excess of a pre-set amount, over a pre-set period.

With either of the above methods, the location of a leak is determined by repeatedly performing the steps of inflating the seal member, supplying fluid under pressure to the pipe, sensing the pressure therein and then deflating the seal member, the position of the seal member in the pipe being progressively moved along the pipe between each inflation thereof, until a significant change in the rate of fall in the sensed pressure over the pre-set time is noted.

BRIEF DESCRIPTION OF THE DRAWINGS

In the following, the invention will further be described and explained, in order to assist an understanding thereof, and certain specific embodiments will be described with reference to the drawings. In the drawings:

FIG. 2 illustrates the components of FIG. 1 fitted to a pipe and with the leak-detection test under way; and FIG. 3 is a cut-away partial view of a modified form of the embodiment of apparatus shown in FIGS. 1 and 2.

DESCRIPTION OF THE PREFERRED EMBODIMENTS

Figure 1:
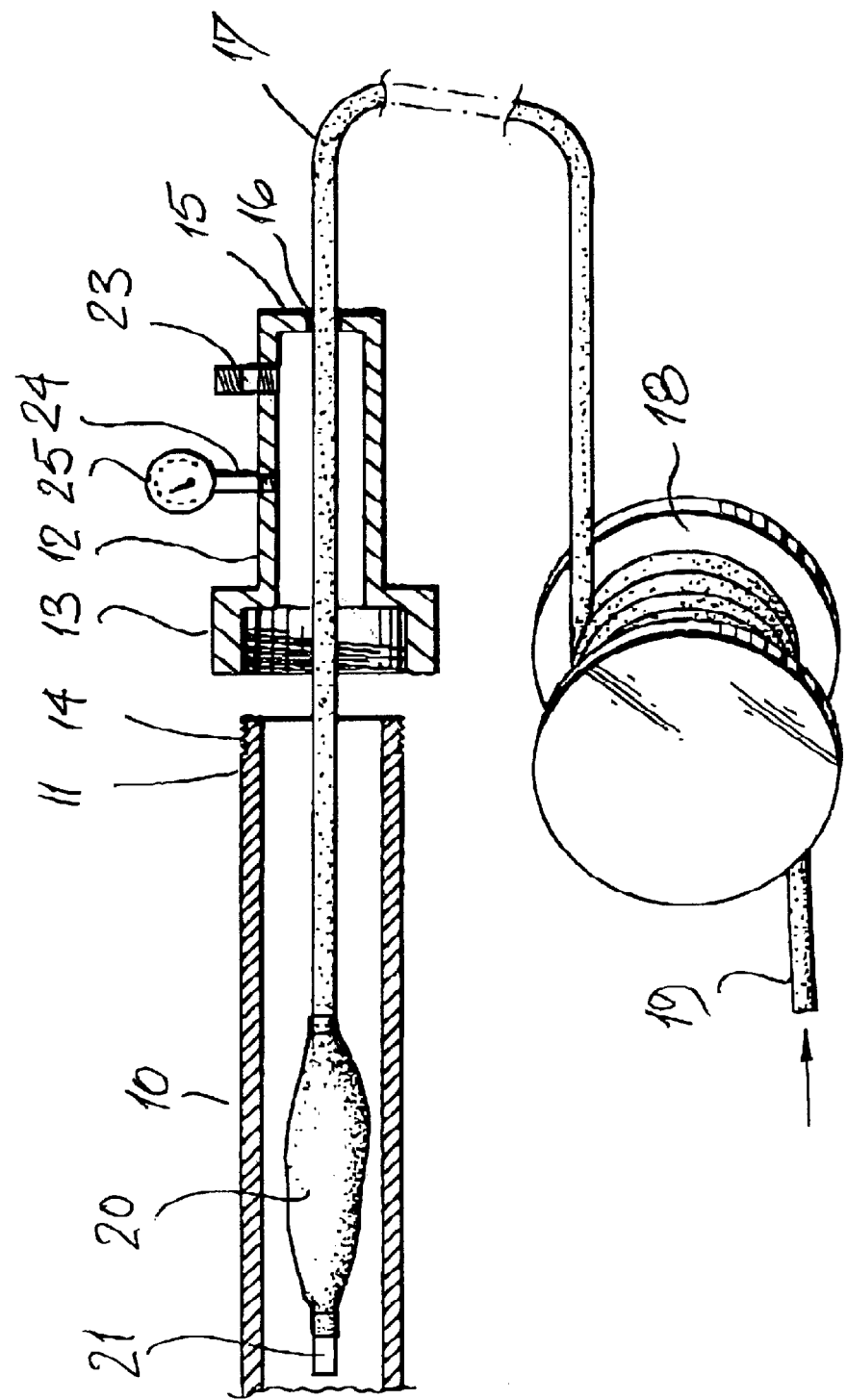
FIG. 1 shows the important components of the method of this invention, to perform a pressure leak-detection test on a pipe.

In a preferred form of the apparatus of the invention, the closure member is configured for fitting to the open end of a pipe. In the alternative, the closure member may be configured for fitting to an opening provided through a side wall of the pipe, but in this case suitable means (such as a plug fitted into the pipe) must be provided to close off that part of the pipe on the side of the closure member away from that along which the hose is to extend.

Preferably, the supply hose is externally calibrated from its free end, to permit an assessment of the length of hose entered into the pipe when a transition is determined between leakage from the pipe and no leakage from the pipe. By knowing the direction in which the pipe extends, this should allow a fairly accurate assessment of the location of the leak and thus the point on the ground surface where an excavation should be made to repair the leak.

As an alternative, or in addition to calibrating the hose, a detection device may be fitted to the free end of the hose. Such a device may take the form of an active or passive transponder, which reacts to a signal from the ground surface, or the detection device could be a simple battery-operated sonde device emitting for example a continuous-wave electromagnetic signal in the LF region. By using such a transmitting sonde and received, a reasonably accurate assessment of the position of the sonde may be made from the ground surface. When the sonde is fitted close to the free end of the hose which in turn is correctly positioned at the location of a leak, the position of the sonde substantially corresponds to the position of the leak and the use of the above-ground receiver provides sufficient location information for an excavation to be made in order to access and repair the leak.

Preferably, the closure member has a seal arrangement around the aperture therein and through which the hose may slide when the seal member is not inflated, the hose expanding radially to permit the seal to be formed with the seal arrangement upon fluid under pressure being supplied to the hose. In this way, a reliable seal may be achieved between the hose and the closure member, which seal permits the hose to be slid when not pressured but which seal operates automatically when the hose is pressured, when a test is to be made.

The seal member provided at or adjacent the free end of the hose advantageously takes the form of an inflatable bladder, for example of an elastomeric material, which bladder is mounted on the free end of the hose and is in communication with the interior of the hose for inflation by fluid supplied under pressure to the hose. Conveniently, the hose may be carried on a suitable drum with a connector for the inner end of the hose whereby only that length of hose required to extend along the pipe is uncoiled from the drum prior to the inflation of the closure member.

To facilitate operation, the closure member may be provided with a connector to permit the connection thereto of a source of fluid under pressure for supply to the interior of the pipe to perform the pressure test. Such a connector may have an automatic one way valve resisting the out-flow of fluid under pressure from the pipe. Moreover, the closure member may have an external pressure gauge, by means of which the internal pressure within the pipe may be monitored.

Referring now to the drawings, FIGS. 1 and 2 show a specific embodiment of apparatus of this invention arranged to perform a leak detection method on a pipe 10 suspected of having a leak and which thus is to be subjected to the pressure leak-detection test. Though shown diagrammatically, the pipe 10 typically is a water pipe which extends underground, access being had to an end portion 11 of the pipe for example through a man-hole, the end of the pipe being made accessible by removal of a connector therefrom. The apparatus comprises a closure member 12 of tubular form but having an internally-threaded head 13, the threads being adapted to mate with threads 14 provided on the end portion 11 of the pipe 10. Though not shown, a sealing member may be provided within the head 13, to effect a seal against the end face or side wall of the pipe 10.

At the opposed end of the closure member 12, there is an end wall 15 having a central aperture 16, a flexible pressure hose 17 extending through that aperture. A resilient seal strip (not shown) is provided within the aperture 16 and through which the hose 17 may be slid, but on pressuring the hose, it expands radially and then effects a seal against the seal strip. The hose itself is wound on a drum 18 though the inner end 19 of the hose is accessible, in a manner known in the art. For example, a rotating connection may be provided for this purpose, within the central region of the drum 18.

The end of the hose remote from the drum 18 is provided with an inflatable bladder 20, sealed to the end portion of the hose at two spaced locations and there being openings through the hose to the interior of the bladder 20, whereby air supplied to end 19 of the hose will inflate the bladder to effect a seal against the internal wall of the pipe 10. A stopper 21 is fitted to the end of the hose itself, in an air-tight sealing manner.

A connector 23 is mounted on the side wall of the closure member 12, which connector 23 may be provided with an internal one-way valve for example of the Schrader form, to permit air to be introduced under pressure to the interior of the closure member and to prevent the release of that air until operated manually. Also mounted on the closure member 12 is a pressure tapping 24 which supports a pressure gauge 25, to indicate the internal pressure within the closure member.

In use, once access can be gained to the end portion 11 of the pipe 10, the end of the hose 17 and bladder 21 are entered into the pipe and the closure member 12 is then threaded on to the threads 14 at the end portion 11 of the pipe. The connection is made up in an air-tight manner and then a known length of hose 17 is pushed through the aperture 16. To facilitate this operation, the hose 17 may be externally calibrated.

Air under pressure is then supplied to end 19 of the hose, so as to inflate the bladder 20 to contact the internal walls of the pipe 10 and effect a seal thereagainst. The hose itself also swells slightly in the radial direction, so contacting and making an air-tight seal to the seal strip within aperture 16. Once pressurised in this way, the hose 17 no longer can be slid easily through the aperture 16.

A pressure test is performed by connecting an inflator (such as a foot-pump) to connector 23 and pumping air into the space defined between the bladder 20 and the closure member 12 until a pre-set pressure is reached. The internal pressure is then monitored for a pre-set period of time—for example, five minutes—and the pressure drop is noted. If that drop exceeds a pre-determined amount, it is presumed that there is a leak between the bladder 20 and the closure member 12. On the other hand, if the loss of pressure is less than the pre-determined amount, it is presumed that there is no significant leak between the closure member 12 and the bladder 20.

Pressure is then released from the hose 17, which also releases pressure from within the pipe 10 as air can then leak out from the assembly, between the aperture 16 and hose 17, though that may be assisted by releasing the valve within the connector 23. Either hose is withdrawn from the closure member (in a case where the presence of a leak has been determined) or more hose is pushed into the pipe (in a case where no leak was determined) and the inflation cycle repeated. This operation is performed as many times as is necessary until two tests are performed at two locations physically closely-spaced along the pipe, with a leak showing at one of those positions and no leak at the other. By measuring the length of hose in the pipe and knowing the direction in which the pipe extends, a reasonable estimate at the ground surface of the position of the leak, may be made.

FIG. 3 shows a modified form of the assembly at the free end of the hose 17, within the pipe 10. Here, a sonde device 26 is mounted at the free end of the hose, for co-operation with a receiver on the ground surface. The sonde device 26 is battery operated and emits a continuous wave signals in the LF region (from 30 Hz to 300 kHz). Such sondes are commercially available for example from Radiodetection Limited of Bristol, England and are used for tracing the route of underground pipes and for finding the position of features in such pipes. Typically, such a sonde may transmit at frequencies of 512 Hz, 1.912 kHz and 32.768 kHz and can be traced to depths of several metres with a compatible pipe locator, such as the range of RD400 receivers made by Radiodetection Limited.

By using such a transmitting sonde and receiver, a reasonably accurate assessment of the position of the sonde may be made from the ground surface. By fitting the sonde close to the bladder and then correctly positioning the bladder at the location of the leak, the position of the sonde corresponds to the position of the leak and the use of the above-ground receiver provides sufficient location information for an excavation to be made in order to access and repair the leak.

Instead of a battery-operated sonde 26, the sonde may be powered from the surface by means of wires carrying current from the surface to the sonde and running internally along the hose 17. Other possibilities include the use of an active or passive transponder rather than the sonde 26, in communication with a transceiver on the ground surface.

Also shown in FIG. 3 is one of the openings 28 through the side wall of the hose 17 and into the interior of the bladder 20, permitting inflation of the bladder upon air being supplied under pressure to the hose 17.

I claim:

1. Apparatus for detecting a leak in a pipe, comprising:
    a closure member for sealing an opening in the pipe, the closure member having an aperture therethrough and a seal arrangement provided around said aperture;
    a flexible fluid supply hose having a free end and extending through said seal arrangement around the aperture in the closure member;
    an inflatable seal member disposed at or adjacent said free end of the hose which seal member is inflatable by fluid supplied under pressure to the hose, the flexible hose being slidable through the seal arrangement prior to the supply of fluid under pressure to the hose but the hose expanding radially to permit a seal to be formed with the seal arrangement on fluid under pressure being supplied to the hose;
    means to supply fluid under pressure to the interior of the pipe after the hose has been passed into the pipe through the aperture in the closure member and the seal member has been inflated; and
    pressure-sensing apparatus to sense the fluid pressure within the pipe between the closure member and the inflated seal member.

2. Apparatus as claimed in claim 1, wherein the pipe has an open end and said closure member is configured for fitting to the open end of the pipe.

3. Apparatus as claimed in claim 2, wherein the closure member has a cylindrical portion provided with internal threads for engagement with external threads furnished on the end portion of the pipe to be tested.

4. Apparatus as claimed in claim 1, wherein external calibrations are provided on the fluid supply hose from its free end, to permit an assessment of the length of hose entered into a pipe to which the closure member has been fitted.

5. Apparatus as claimed in claim 1, wherein a location detection device is fitted to the hose, at or adjacent the free end thereof.

6. Apparatus as claimed in claim 5, wherein said location device comprises one of an active transponder and a passive transponder.

7. Apparatus as claimed in claim 5, wherein said location device comprises a battery-operated transmitter sonde arranged to transmit an electromagnetic signal.

8. Apparatus as claimed in claim 1, wherein the seal member is in the form of an inflatable bladder mounted on the free end of the hose and in communication with the interior thereof for inflation by fluid supplied under pressure to the hose.

9. Apparatus as claimed in claim 1, wherein the closure member is provided with a connector to permit the connection thereto of a source of fluid under pressure, for supply to the interior of the pipe.

10. Apparatus as claimed in claim 9, wherein the connector is provided with an automatic one-way valve resisting the out-flow of fluid under pressure from the pipe, through the connector.

11. Apparatus as claimed in claim 1, wherein a pressure gauge is arranged to sense the pressure internally of the pipe, through a tapping provided on the closure member.

12. Apparatus as claimed in claim 1, in conjunction with an air-pump selectively connectable to the end of the hose remote from the inflatable seal member and to a connector communicating with the interior of the pipe.

13. A method of determining the location of a leak in a pipe, comprising:
    fitting a closure member in a sealing manner to an opening in the pipe, the closure member having an aperture therein and a seal arrangement around the aperture through which seal arrangement extends a flexible fluid supply hose in a slidable and sealable manner, the hose having an inflatable seal member at or adjacent its free end for inflation by fluid supplied under pressure to the hose;
    sliding the hose through the aperture until a known length of hose has entered the pipe;
    supplying fluid under pressure to the hose thereby inflating the seal member to effect a seal to the interior wall of the pipe and also radially expanding the hose thereby to effect a seal in conjunction with the seal arrangement at the closure member;
    supplying fluid under pressure to the interior of the pipe between the closure and the inflated seal member; and
    sensing the pressure in the pipe and monitoring for a fall in that pressure in excess of a pre-set amount, over a pre-set period.

14. A method as claimed in claim 13, wherein the pipe has an open end and the closure member is fitted to the open end of the pipe to close that open end.

15. A method as claimed in claim 14, wherein the location of a leak is determined by repeatedly performing the steps of inflating the seal member, supplying fluid under pressure to the pipe, sensing the pressure therein and then deflating the seal member, the position of the seal member in the pipe being progressively moved along the pipe between each inflation thereof, until a significant change in the rate of fall in the sensed pressure over the pre-set time is noted.

16. A method as claimed in claim 14, wherein the fluid used to inflate the seal member and to pressurise the pipe is air.

17. A method as claimed in claim 16, wherein the air is supplied under pressure selectively to the hose or to the pipe from a manually-operated or foot-operated pump.

18. A method of determining the location of a leak in a pipe, comprising:

fitting a closure member in a sealing manner to an opening in the pipe, the closure member having an aperture therein and a seal arrangement around the aperture, a flexible fluid supply hose extending through the seal arrangement in a slidable manner which said hose has an inflatable seal member at or adjacent its free end for inflation by fluid supplied under pressure to the hose and further having at or adjacent its free end a device selected from the group consisting of an active transponder, a passive transponder and an electromagnetic transmitter sonde;

sliding the hose through the aperture and monitoring from the surface the position of the free end of the hose by means of an electromagnetic location determining device in communication with said device at or adjacent the free end of the hose;

supplying fluid under pressure to the flexible hose thereby inflating the seal member to effect a seal to the interior wall of the pipe and also radially expanding the hose thereby effecting a seal in conjunction with the seal arrangement at the closure member;

supplying fluid under pressure to the interior of the pipe between the closure member and the inflated seal member; and sensing the pressure in the pipe and monitoring for a fall in that pressure in excess of a pre-set amount, over a pre-set period.

19. A method as claimed in claim 18, wherein the location of a leak is determined by repeatedly performing the steps of inflating the seal member, supplying fluid under pressure to the pipe, sensing the pressure therein and then deflating the seal member, the position of the seal member in the pipe being progressively moved along the pipe between each inflation thereof whilst monitoring the position of the free end from the surface, until a significant change in the rate of fall in the sensed pressure over the pre-set time is noted.

* * * * *